US012515563B2

(12) United States Patent
Moseley et al.

(10) Patent No.: US 12,515,563 B2
(45) Date of Patent: Jan. 6, 2026

(54) CAR SEAT SENSING AT MULTIPLE DISTANCES

(71) Applicant: Tactual Labs Co., New York, NY (US)

(72) Inventors: Braon Moseley, Round Rock, TX (US); Darren Leigh, Leesburg, VA (US); Tod Kupstas, Wynnewood, PA (US)

(73) Assignee: Tactual Labs Co., New York, NY (US)

( * ) Notice: Subject to any disclaimer, the term of this patent is extended or adjusted under 35 U.S.C. 154(b) by 85 days.

(21) Appl. No.: 18/017,509

(22) PCT Filed: Jul. 16, 2021

(86) PCT No.: PCT/US2021/041976
§ 371 (c)(1),
(2) Date: Jan. 23, 2023

(87) PCT Pub. No.: WO2022/020199
PCT Pub. Date: Jan. 27, 2022

(65) Prior Publication Data
US 2023/0278466 A1    Sep. 7, 2023

Related U.S. Application Data

(60) Provisional application No. 63/055,832, filed on Jul. 23, 2020.

(51) Int. Cl.
*B60N 2/90*    (2018.01)
*B60N 2/00*    (2006.01)
*B60N 2/26*    (2006.01)

(52) U.S. Cl.
CPC ............ *B60N 2/003* (2023.08); *B60N 2/0022* (2023.08); *B60N 2/0025* (2023.08); *B60N 2/0026* (2023.08); *B60N 2/0027* (2023.08); *B60N 2/0035* (2023.08); *B60N 2/267* (2023.08); *B60N 2210/12* (2023.08)

(58) Field of Classification Search
CPC .... B60N 2/003; B60N 2/0021; B60N 2/0022; B60N 2/0027; B60N 2/0026; B60N 2/0025; B60N 2/0035; B60N 2/267; B60N 2210/12
See application file for complete search history.

(56) References Cited

U.S. PATENT DOCUMENTS

| | | | |
|---|---|---|---|
| 6,498,590 B1* | 12/2002 | Dietz | G06F 3/0445 343/893 |
| 7,701,338 B2* | 4/2010 | Kamizono | B60R 21/01556 340/561 |
| 9,933,909 B2* | 4/2018 | Wigdor | G06F 3/0421 |
| 10,572,088 B2* | 2/2020 | Alack, Jr. | G06F 3/04166 |
| 10,705,667 B2* | 7/2020 | Moseley | G06F 3/0416 |
| 10,901,562 B2* | 1/2021 | Leigh | B60N 2/0035 |

(Continued)

*Primary Examiner* — Philip F Gabler
(74) *Attorney, Agent, or Firm* — Adam B. Landa (57) ABSTRACT

A sensor system is sensitive to the determination of activity, movement and position of a passenger in a vehicle. In particular, the determination of the position and movement of passengers in a vehicle can be enhanced by providing groupings of transmitting antennas and/or multiple infusion antennas. The sensing system is able to determine the movement and activity of the passengers at various ranges and locations within the vehicle.

17 Claims, 4 Drawing Sheets

(56) References Cited

U.S. PATENT DOCUMENTS

| | | | |
|---|---|---|---|
| 11,780,394 B2* | 10/2023 | Althaus | B60R 21/0154 307/10.1 |
| 2007/0182553 A1* | 8/2007 | Kamizono | B60R 21/01554 340/561 |
| 2016/0069714 A1* | 3/2016 | Scheuing | G01P 15/18 702/104 |
| 2018/0364840 A1* | 12/2018 | Alack, Jr. | G06F 1/163 |
| 2019/0042032 A1* | 2/2019 | Moseley | G06F 3/0446 |

* cited by examiner

CAR SEAT SENSING AT MULTIPLE DISTANCES

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems and methods relate in general to the field of sensing, and in particular to vehicular components comprising sensors.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

In various embodiments, the present disclosure is directed to sensor systems able to determine position and location of objects within a vehicle. The sensing system is able to transmit a plurality of signals during a transmission period and use the sensed signals in order to create heat maps that represent the movement and position of objects and people within vehicles.

Throughout this disclosure, the term "event" may be used to describe periods of time in which muscle activity and/or position of the body is detected and determined. In accordance with an embodiment, events may be detected, processed, and/or supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristics. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The present application contemplates various embodiments of sensors designed for implementation in sensing systems. The sensor configurations described herein are suited for use with frequency-orthogonal signaling techniques (see, e.g., U.S. Pat. Nos. 9,019,224 and 9,529,476, and 9,811,214, all of which are hereby incorporated herein by reference). The sensor configurations discussed herein may be used with other signal techniques, including scanning or time division techniques, and/or code division techniques. It is pertinent to note that the sensors described and illustrated herein are suitable for use in connection with signal infusion (also referred to as signal injection) techniques and apparatuses. Signal infusion is a technique in which a signal is transmitted to a person, that signal being capable of travelling on, within and through the person. In an embodiment, an infused signal causes the object of infusion (e.g., a hand, finger, arm or entire person) to become a transmitter of the signal.

The presently disclosed systems and methods further involve principles related to and for designing, manufacturing and using capacitive based sensors and capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors having concepts that are germane to and able to be used in connection with the presently disclosed sensors. In the aforementioned sensors, interactions are sensed when a signal from a row conductor is coupled (increased) or decoupled (decreased) to a column conductor and the result detected from that column conductor. By sequentially exciting the row conductors and measuring the coupling of the excitation signal at the column conductors, a heatmap reflecting capacitance changes of the sensor, and thus proximity to the sensor, can be created. The entire disclosure of these patents and applications incorporated therein by reference are incorporated herein by reference.

This application also employs principles used in fast multi-touch sensors and other interfaces disclosed in the following: U.S. Pat. Nos. 9,933,880; 9,019,224; 9,811,214; 9,804,721; 9,710,113; 9,158,411; 10,191,579; 10,386,975; 10,175,772; 10,528,201. Familiarity with the disclosure, concepts and nomenclature within these patents is presumed. The entire disclosure of these patents and applications incorporated therein by reference are incorporated herein by reference. This application also employs principles used in fast multi-touch sensors and other interfaces disclosed in the following: U.S. patent application Ser. No. 15/195,675; Ser. No. 15/904,953; Ser. No. 15/905,465; Ser. No. 15/943,221; Ser. No. 16/102,185; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

Certain principles of a fast multi-touch (FMT) sensor have been disclosed in the patent applications discussed above. Orthogonal signals may be transmitted into a plurality of transmitting antennas (or conductors) and information may be received by receivers attached to a plurality of receiving antennas (or conductors). In an embodiment, receivers "sample" the signal present on the receiving antennas (or conductors) during a sampling period ($\tau$). In an embodiment, signal (e.g., the sampled signal) is then analyzed by a signal processor to identify touch events (including, e.g., actual touch, near touch, hover and farther away events that cause a change in coupling between a transmitting antenna (or conductor) and receiving antennas (or conductor)). In an embodiment, one or more transmitting antennas (or conductors) can move with respect to one or more receiving antennas (or conductors), and such movement causes a change of coupling between at least one of the transmitting antennas (or conductors) and at least one of the receiving antennas (or conductors). In an embodiment, one or more transmitting antennas (or conductors) are relatively fixed with respect to one or more receiving antennas (or conductors), and the interaction of the signal and/or signals transmitted with environmental factors causes a change of coupling between at least one of the transmitting antennas (or conductors) and at least one of the receiving antennas (or conductors). The transmitting antennas (or conductors) and receiving antennas (or conductors) may be organized in a variety of configurations, including, e.g., a matrix where the crossing points form nodes, and interactions are detected by processing of received signals. In an embodiment where the orthogonal signals are frequency orthogonal, spacing between the orthogonal frequencies, $\Delta f$, is at least the reciprocal of the measurement period T, the measurement period T being equal to the period during which the column conductors are sampled. Thus, in an embodiment, the received at a column conductor may be measured for one millisecond ($\tau$) using frequency spacing ($\Delta f$) of one kilohertz (i.e., $\Delta f = 1/\tau$).

In an embodiment, the signal processor of a mixed signal integrated circuit (or a downstream component or software) is adapted to determine at least one value representing each frequency orthogonal signal transmitted to (or present on) a row conductor (or antenna). In an embodiment, the signal processor of the mixed signal integrated circuit (or a downstream component or software) performs a Fourier transform on the signals present on a receive antenna (or conductor). In an embodiment, the mixed signal integrated circuit is adapted to digitize received signals. In an embodiment, the mixed signal integrated circuit (or a downstream component or software) is adapted to digitize the signals present on the receive conductor or antenna and perform a discrete Fourier transform (DFT) on the digitized information. In an embodiment, the mixed signal integrated circuit (or a downstream component or software) is adapted to digitize the signals present on the received conductor or antenna and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as the term frequency orthogonal is used herein, two signals are considered frequency orthogonal if substantially all of the contribution of one signal to the DFT bins is made to different DFT bins than substantially all of the contribution of the other signal.

When sampling, in an embodiment, received signals are sampled at at least 1 MHz. In an embodiment, received signals are sampled at at least 2 MHz. In an embodiment, received signals are sampled at at least 4 Mhz. In an embodiment, received signals are sampled at 4.096 Mhz. In an embodiment, received signals are sampled at more than 4 MHz. To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmitting antenna. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as a measure corresponding to signal strength for that bin. In an embodiment, the square root of the sum of the squares of the I and Q components is used as measure corresponding to signal strength for that bin.

In addition to the determination of information regarding what occurs in proximity to the transmitting and receiving antennas or conductors, as described above, it has also been discovered that it is possible to infuse a signal into a person or conductive object and that the infused signal will impact a sensor in proximity to the infused person or object. In U.S. patent application Ser. No. 16/193,476, entitled "System and Methods for Infusion Range Sensor," incorporated herein by reference, a method and system for measuring the distance of an infused object from a sensor was discussed. In that application, a body part or an object was infused with a signal and moved with respect to a sensor. Through the movement of the infused body part or object, the system was able to determine measurements based on the received signals and determine the position of the body part or object from the sensor.

Building off the insights learned from the aforementioned disclosure regarding determining the position of a person or object infused with a signal, further uses of infusion were explored. A person or object that has the signal infused therein can impact a sensor system and what the receivers in the sensor system measure. In an embodiment, an infused signal is frequency orthogonal with respect to the other signals transmitted and received by the sensing apparatus. Generally, as the term is used herein, infusion refers to the process of transmitting signals to the body of a subject, effectively allowing the body (or parts of the body) to become an active transmitting source of the signal. In an embodiment, an electrical signal is injected into the hand (or other part of the body) and this signal can be detected by a sensor even when the hand (or fingers or other part of the body) are not in direct contact with the sensor's touch surface. To some degree, this allows the proximity and orientation of the hand (or finger or some other body part) to be determined, relative to a surface. In an embodiment, signals are carried (e.g., conducted) by the body, and depending on the frequencies involved, may be carried near the surface or below the skin's surface. In an embodiment, frequencies of at least the KHz range may be used in frequency infusion. In an embodiment, frequencies in the MHz range may be used in frequency infusion. To use infusion in connection with FMT as described above, in an embodiment, an infusion signal can be selected to be orthogonal to the transmitted signals, and thus it can be seen in addition to other signals being transmitted. Additionally, in an embodiment, more than one signal, each signal being orthogonal to each other signal infused, can be infused into a person. Each orthogonal infused signal, when measured, provides different information than each other orthogonal infused signal, when measured. In an embodiment, each infused signal is frequency orthogonal from each other infused signal.

Further discussion regarding the implementation of the transmitting antennas (or conductors) and receiving antennas (or conductors) in association with wearables can be found in U.S. patent application Ser. No. 15/926,478, U.S. patent application Ser. No. 15/904,953, U.S. patent application Ser. No. 16/383,090 and U.S. patent application Ser. No. 16/383,996, the contents of all of the aforementioned applications incorporated herein by reference.

Turning now to vehicle implementation, transmitting antennas (also referred to as conductors) and receiving antennas (also referred to as conductors) can be implemented in the materials and fabrics used within or on components of the vehicle. One such implementation of placing the sensor systems within or on other components of the vehicle is within materials forming the car seat, such as fabrics, leather, etc. In an embodiment, sensor systems are located within seats made of cloth. In an embodiment, sensor systems are located on seats made of cloth. In an embodiment, sensor systems are located on seats made of leather. In an embodiment, sensor systems are located within seats made of leather. In an embodiment, sensor systems are located on seats made of leather. In an embodiment, sensor systems are located within seats made of plastic. In an embodiment, sensor systems are located on seats made of plastic. In an embodiment, sensor systems are located proximate to and or otherwise operably located near a passenger's location.

Figure 1:
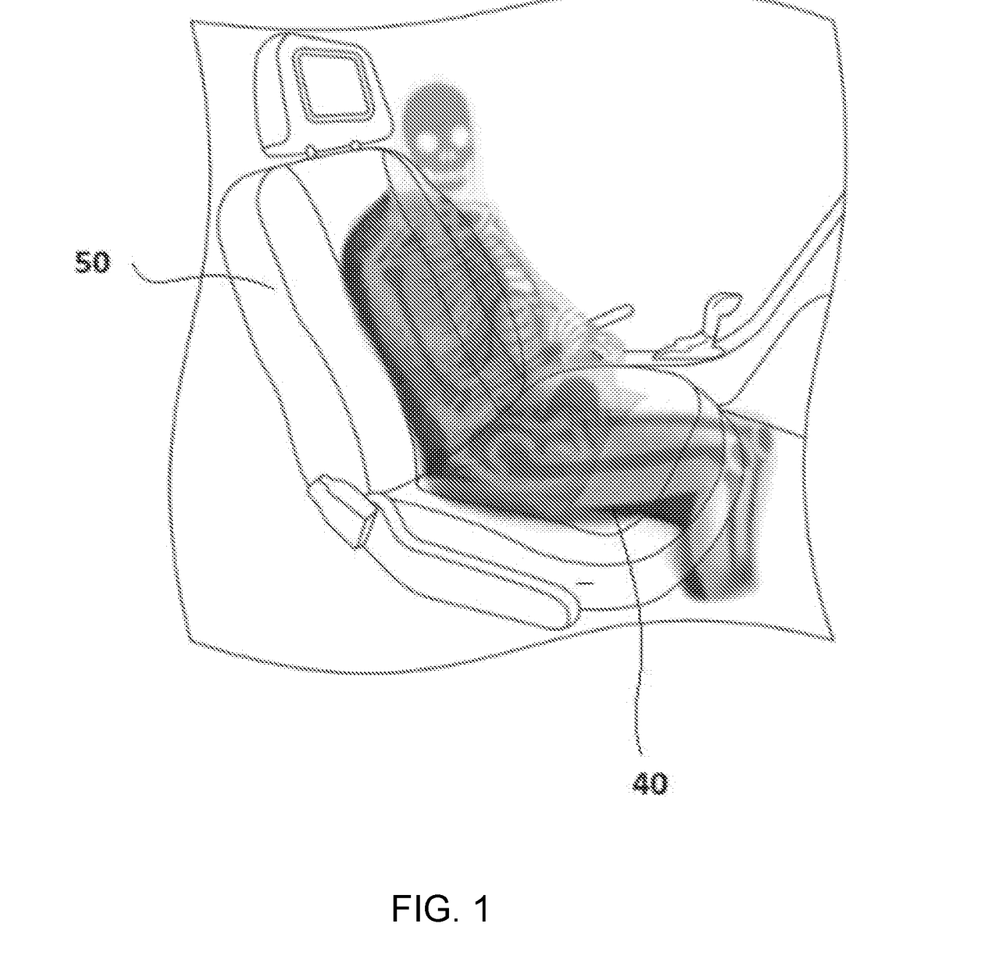
FIG. 1 is an illustration of an occupant in a vehicle.
Figure 2:
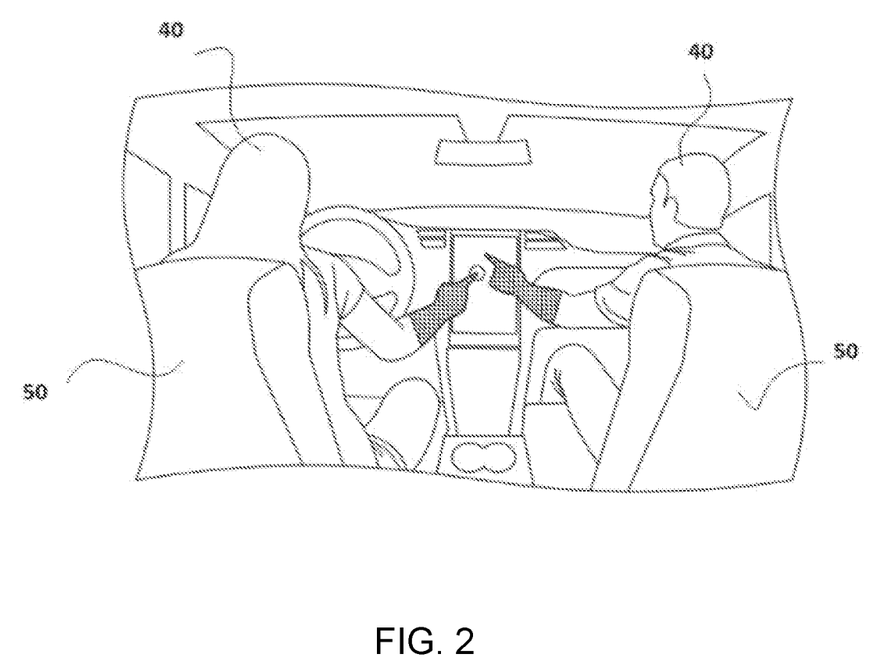
FIG. 2 is an illustration of occupants within a vehicle.

Referring to FIGS. 1 and 2, shown are occupants 40 sitting on seats 50 located within a vehicle. While seats 50 are the seats located in the front row, it should be understood that any of the potential seats located within the vehicle may have sensor systems implemented therein, on or proximate to the passenger. Furthermore, sensor systems may be located throughout the vehicle and in certain situations the sensor systems may be located in a manner that permits determination of activity within the vehicle or the presence of a passenger.

Figure 3:
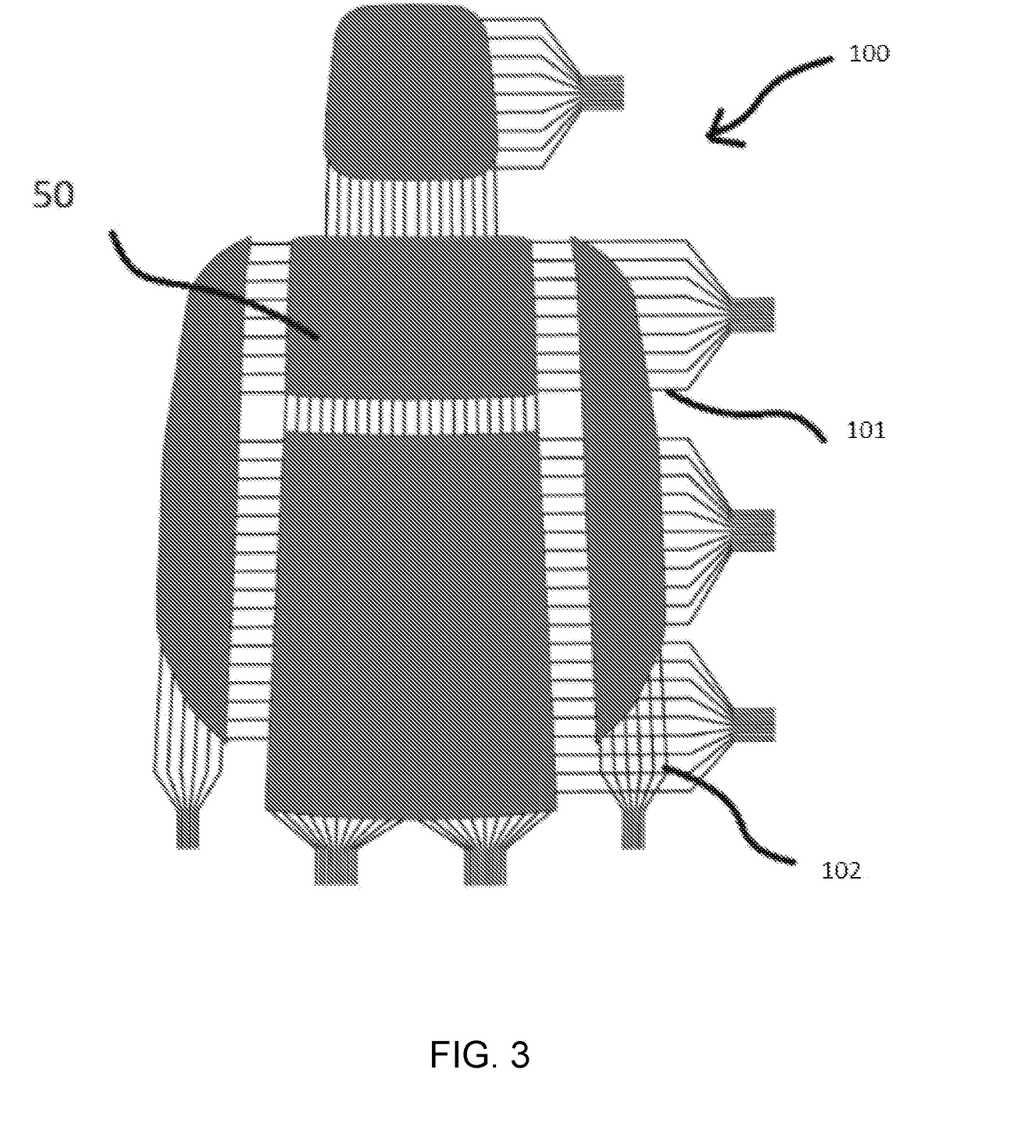
FIG. 3 shows a front view of an embodiment of a sensor used with a vehicle seat.
Figure 4:
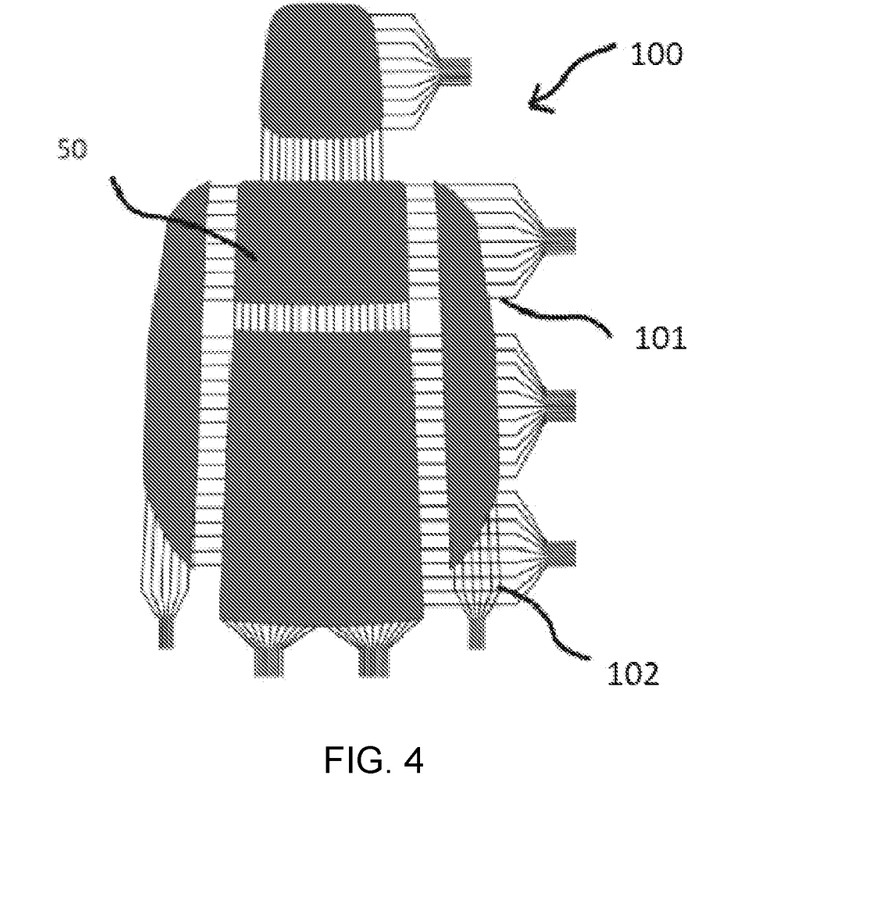
FIG. 4 shows a back view of an embodiment of a sensor used with a vehicle seat.

FIGS. 3 and 4 show an exemplary embodiment of a sensor system 100 that is used with seat 50. FIG. 3 shows a front view of a top layer of the seat 50. FIG. 4 shows a rear view of the top layer of the seat 50. The sensor system 100 is formed with transmitting antennas 101 and receiving antennas 102, which are operably connected to at least one transmitter (not shown), at least one receiver (not shown) and at least one signal processor (not shown). Transmitting antennas 101 can also function as receiving antennas and receiving antennas 102 can also function as transmitting antennas. In an embodiment, more than one layer of the sensor system 100 used in the seat 50. In an embodiment, each portion of the seat 50 has its own sensor system. For example, the headrest has its own sensor portion, the arm rests have their own sensor portion, the backrest has its own sensor portion, and the seating area has its own sensor portion. In an embodiment, only some portions of the seat 50 have sensor systems. In FIGS. 3 and 4, the sensor system 100 is formed within the entirety of the seat 50.

In an embodiment, each transmitting antenna 101 transmits a unique orthogonal signal. In an embodiment, each transmitting antenna 101 transmits a unique frequency orthogonal signal. In an embodiment, more than one of the transmitting antennas 101 has the same signal transmitted thereon. By having more than one transmitting antenna 101 transmitting the same signal, the strength of that signal can be larger and the sensor system is able to determine activity and motion further away from the sensor system. In an embodiment, more than one group of transmitting antennas is adapted to transmit the same signal during a period of time (aka as an integration period of time, or integration period).

In an embodiment, a sensor system is adapted to transmit a plurality of signals on transmitting antennas with the same signal being transmitted on a group of transmitting antennas. That is to say that the same signal is transmitted on more than one of the transmitting antennas. By transmitting the same signal on more than one of the transmitting antennas, the transmitting antennas are able to function so as to sense at distances further from the surface and determine the approach of an object. The sensor system is able to function in this mode until it is determined that an object or person is approaching the seat.

Once an approach to the seat is determined, the sensor system can switch to a mode where each of the transmitting antennas transmit an orthogonal signal. This provides more detailed discrimination of the movement and position of the object or person. In an embodiment, the sensor system can have multiple groups of transmitting antennas transmit the same signals to determine approach and then reduce the number of transmitting antennas that are transmitting the same signal as the object or person gets closer. That is to say there can be an increased focusing of the sensitivity of the sensor system with respect to the seat so as to determine more information and provide different sensitivity as a person or object approaches and ultimately makes contact with the seat.

This grouping of transmitting antennas can be implemented in other locations within the vehicle to expand the sensing capabilities of the sensing system. In an embodiment, multiple sensing systems are located within the seat, each sensing system implementing different groupings of transmitting antennas and signals transmitted thereon. In an embodiment, the headrest has a grouping of transmitting antennas and the seat has another grouping of transmitting antennas. In an embodiment, the grouping of transmitting antennas on the seat transmit different signals than the grouping of transmitting signals in the head rest. Furthermore, the sensing system located in the headrest can transmit a different grouping of signals at different times or during different periods of time than the sensing system in the seat.

In an embodiment, the grouping of signals in the first headrest senses or changes at different times than the grouping of signals in the seat. For example, a sensing systems in the headrest can have a group of transmitting antennas in the headrest change from using the grouping to transmitting unique signals on each transmitting antenna at a time different than the sensing system in the seat based on when a body part approaches any of the areas.

In an embodiment, multiple regions of the vehicle can transmit signals at different times. For example, there is the front interior, middle interior, and rear interior. Further, in an embodiment, there are portions of the exterior of the vehicle that can determine the approach of objects and people.

In an embodiment, transmitting antennas may transmit signals on some transmitting antennas during different modes. In an embodiment, the sensing systems may have passive transmitting modes and active transmitting modes. In an embodiment, the sensing systems are implemented in and on the vehicle so that determination of an approaching passenger can be ascertained and subsequently interior sensing modes are activated when an approaching passenger is determined. In an embodiment, multiple regions of the vehicle can activate different groupings depending on the activity in the vehicle. In an embodiment, as passengers approach some areas and move away from other areas, different groupings of transmitting antennas are activated.

In an embodiment, sensing systems are implemented that are able to incorporate both infusion and the transmitting of signals on the transmitting antennas in order to determine position and motion in the vehicle. In an embodiment, an infusion antenna is adapted to transmit signals into the passenger. When a signal is transmitted into a passenger, the passenger transmits a signal that is able to be received at the receiving antennas. Signals received at the receiving antennas are able to be used in order to determine position and motion of a passenger. The infused signal can be orthogonal to each other signal transmitted in the various sensor systems. In an embodiment, more than one signal is infused into a passenger.

In an embodiment, more than one signal is infused into a passenger from different locations in the vehicle. For example, one infused signal may be transmitted into a passenger from a floor location while another infused signal may be transmitted into a passenger from a head rest location. The sensor system uses the infused signal received at receiving antennas to determine motion and position of a passenger within the vehicle. Since the signals are transmitted into a passenger from different locations within the vehicle, different activity and behavior can be determined from the signal received at the receiving antennas. The sensor systems are able to use combinations of the signals received via the interaction of the passenger with the signals transmitted via the transmitting antennas and the signals received that are transmitted via the passenger in order to provide various views of activity of the passenger, passengers and/or objects within the vehicle.

In an embodiment, each passenger has multiple signals infused into each of the passengers. Each signal infused into the passengers is orthogonal to each other signal infused into the passengers. In an embodiment, each signal infused into the passengers is frequency orthogonal to each other signal transmitted into the passengers.

In an embodiment, the material of a seat has embedded within it a sensor system formed of transmitting and receiving antennas (also referred to herein as conductors). In an embodiment, the material of the seat has placed on it a sensor system formed of transmitting and receiving antennas. In an embodiment, the seat has embedded within it and placed upon it sensor systems formed of transmitting and receiving antennas. In an embodiment, antennas are placed upon a flexible substrate (which could be made from a non-conductive fabric, plastic or elastomeric material) and used to form the material of the seat. In an embodiment, antennas are embedded within a flexible substrate and used to form the material of the seat. In an embodiment, a conductive thread is placed on or stitched into a flexible material (e.g., fabric) in a manner that permits a desired expansion (e.g., zig-zag, waves, etc.) in one or more desired dimensions and used to form the seat. In an embodiment, a flexible substrate or fabric has crossing zig-zag patterns (or e.g., crossing sine wave patterns) used to form the seat. In an embodiment, the flexible substrate or the fabric has one of the patterns discussed above or another pattern adapted to withstand the flexible use by people.

A transmitter transmits a unique frequency orthogonal signal on each of the transmitting antennas. Receiving antennas can receive the transmitted signals and/or respond to the capacitive interaction that can occur through usage of the material. A signal processor processes a measurement of the received signals and uses the measurements in order to form a heat map, or other set of data, reflecting the interaction that is occurring with the car seat. In an embodiment, each of the transmitting antennas and each of the receiving antennas functions as either a transmitting antenna or receiving antenna. In an embodiment, there is at least one transmitting antenna and a plurality of receiving antennas. In an embodiment, there is a plurality of transmitting antennas and at least one receiving antenna.

When an occupant 40 sits on seat 50 in the car there is movement of and/or within the seat 50. The material from which the seat 50 is formed moves and/or flexes. This movement causes the transmitting antennas and receiving antennas to move with respect to each other. This movement impacts the measurement of signal that is received by the receiving antennas. This movement not only occurs when an occupant 40 sits on the seat 50, but also during the movement of the vehicle and while the occupant 40 is sitting on the seat 50 when the car is at rest. Additionally, the occupant 40 can interact with the field generated by the transmitting antenna or antennas and the receiving antenna or antennas. The interaction of the occupant with the field causes different measurements to be taken by the system.

Processed measurements taken from the receivers connected to the receiving antennas can be used in order to determine whether or not an occupant 40 is seated on the seat 50. The measurements taken and processed by the signal processor are able to be used by the sensor system to be further processed in order to determine a use of the seat 50. In an embodiment, a determination of the use of the seat is run on the signal processor and is able to take the measurements and determine if there is a use of the seat. In an embodiment, the determination of the use of the seat is performed by software logic that processes the measurements processed by the signal processor. In an embodiment, the determination of the use of the seat is determined by a part of the sensor system located separately from the signal processor. In an embodiment, the determination of the use of the seat is performed by circuitry that processes the measurements processed by the signal processor. In an embodiment, the determination of the use of the seat is performed by part of the sensor system located in the vehicle at a location away from the seat. In an embodiment, the determination of the use of the seat is located in the vehicle at a location proximate to the seat.

In an embodiment, the sensor system detects a presence or absence of an occupant of the vehicle. In an embodiment, the sensor system detects a biometric of an occupant. In an embodiment, the sensor system determines the heart rate of an occupant. In an embodiment, the sensor system determines respiratory activity of an occupant. In an embodiment, the sensor system determines a weight estimate of an occupant. In an embodiment, the sensor system determines a height estimate of an occupant. In an embodiment, the sensor system detects the position of an occupant within the seat. In an embodiment, the sensor system detects a type of occupant within the seat. In an embodiment, the sensor system determines if a car is stolen based on detected occupant ID. In an embodiment, the sensor system detects the presence of a child. In an embodiment, the detector module detects the presence of a child seat. In an embodiment, the sensor system detects the presence of a child in the child seat. In an embodiment, the sensor system determines the position of the seat back. In an embodiment, the sensor system determines the comfort settings of a seat. In an embodiment, the sensor system detects the distance of a head from head rest. In an embodiment, the sensor system detects a type of % classification category of occupant vs. non-occupant detection (i.e. an object present but exclusively not a human occupant). In an embodiment, the sensor system determines if something is left behind in a vehicle. In an embodiment, the sensor system detects an object. In an embodiment, the sensor system detects an object via passive means. In an embodiment, the sensor system detects an object via active means. In an embodiment, the sensor system detects a type of occupant object by either active and/or passive means. In an embodiment, the sensor system detects at least one of a person, car seat, purse, laptop, phone, dog, cat, etc. In an embodiment, each logic category (i.e., presence or absence of human occupant), or measurement estimation (i.e. height weight) can each separately also include a calculated factor of confidence (i.e. confidence level) (e.g. 99.9999% empty, 80% confidence height 5'6"). In an embodiment, the sensor system detects cushion and back pressure distribution. In an embodiment, the sensor system determines dynamic movement, such as how much and how often an occupant moves.

As noted above, information in addition to presence regarding the occupant 40 can be ascertained due to the sensitivity of the sensors being implemented. In an embodiment, machine learning is applied to the data received from the measurements taken by the sensors within or on seat 50 in order to accurately determine the weight of the individual sitting on the seat 50. By being able to accurately determine physical characteristics of the person sitting on the seat 50, the car can further be programmed to respond accordingly by correlating the weight of the person with the likely identity of the driver. For example, in an embodiment, the car automatically adjusts its settings when the seat 50 senses that a 185 pound man is sitting in the car. The settings of the car may be adjusted for the person most likely associated with the 185 pound weight reading. In an embodiment, the number of occupants in a vehicle is determined using the measurements from the car seat sensors and the detector module. In an embodiment, the number of and weight of the occupants in a vehicle is determined using the sensors. In an embodiment, the vehicle is programmed in order to determine the identity of the occupants 40 based upon where they are sitting, their weight and/or other physical characteristics ascertained via the sensors in the car seat 50. In an embodiment, the vehicle optimizes fuel usage based on the vehicle load determined by the sensors. In an embodiment, sensors in the passenger area determine, based on the weight reading, if there remains an infant in a car seat. This reading is then used to trigger an alarm, or other warning indicator, if the infant is not removed when the vehicle is stopped for a period of time.

It should be understood that sensor systems may be located at other locations on and within the seat 50 in addition to the sitting area of the seat 50. In an embodiment, sensor systems are located within the back area of the seat 50. Sensor systems located in the back area of the seat 50 can be used in order to determine information regarding various movements of the occupant. For example, sudden movements can be used in order to determine additional information related to the speed of the vehicle or the terrain the vehicle may be moving over. In an embodiment, this type of information is used by the vehicle to adjust the controls of the vehicle or the movement of the vehicle. For example, in an embodiment, determination that there is sudden movement or jerking over a threshold deploys airbags or triggers brake activity. In an embodiment, sensors are located within the headrest of the vehicle. In an embodiment, biometric data is taken regarding the occupant 40 based upon his or her interaction with the seat 50. In an embodiment, the position and movements of an occupant 40 are used to determine if the occupant 40 is falling asleep. An alarm can be triggered if the occupant is falling asleep. Other potentially dangerous situations can also be monitored and detected by the sensor systems based on positioning and movements of the occupant 40 while on the seat 50, such as distracted driving and driving under the influence of a substance.

Referring to FIGS. 1 and 2, in addition to the sensor systems located within and/or on the seat 50 where the interaction between the transmitting antennas and the receiving antennas is detected, an infusion transmitting antenna or infusion transmitting antennas can be located within and/or near the seat. Infusion is discussed further below in more detail. In an embodiment, the user holds or wears an object separate from the vehicle that is able to transmit a unique orthogonal signal. In an embodiment, the user has a signal infused via one of the components of the vehicle. In an embodiment, signals are infused into the user via the steering wheel. In an embodiment, a signal is infused into a user via the dashboard. In an embodiment, a signal is transmitted into the user via an interior portion of the vehicle. In an embodiment, a signal is transmitted in the user via an exterior portion of the vehicle.

FIG. 2 shows shading of the occupants 40 that illustrates the presence of an infused signal within the occupants 40. The infused signal may be used to provide additional functionality with respect to the instruments located on the vehicle's dashboard or throughout the vehicle. In an embodiment, various settings are enabled or disabled based upon the signal transmitted by the occupant 40. In an embodiment, controls are enabled or disabled based upon the signal transmitted by the occupant 40. In an embodiment, garage door openers are activated by the signal transmitted by the occupant 40 via interaction with the interior of the vehicle.

More than one signal can be infused into each occupant of the vehicle. In an embodiment, each of the signals infused into each occupant of the vehicle is frequency orthogonal to each other signal infused into an occupant or occupants of the vehicle. In an embodiment, a signal is infused into an occupant in the driver's seat and another signal that is frequency orthogonal to the signal infused into the occupant of the person in the driver's seat is infused into another passenger of the vehicle. Components of the vehicle are able to determine, based on measurements of the signal, who is operating or interacting with the component. In an embodiment, certain components can function differently based on the identified passenger. In an embodiment, the components of the vehicle are able to determine the identity of a passenger during simultaneous interaction with the component of the vehicle.

In an embodiment, multiple signals that are frequency orthogonal to each other are infused into each passenger. In an embodiment, each of the infused signals carry different information in order to interact with components of the vehicle. In an embodiment, each of the infused signals interacts with components of the vehicle that are adapted to operate differently depending upon the signal that is infused. In an embodiment, components are adapted to operating differently depending on the measurements of more than one of the frequency orthogonal signals. For example, measuring the presence of one signal may cause a component to operate in a first manner. Measuring the presence of another signal that is frequency orthogonal to the first signal may cause the component to operate in a second manner. Measuring the presence of both signals may cause the component to operate in a third manner. This could, for example, be implemented into an interactive screen in the vehicle or with seats. In an embodiment, the infused signals are infused into different people. In an embodiment, the infused signals are infused into one individual but are infused into the individual form different parts of the vehicle or locations of the vehicle. For example, one of the infused signals may indicate that the person is located in a seat while another infused signal may indicate that the person is touching the steering wheel or the mirror. In an embodiment, combinations of the infused signals can be measured to determine whether or not car doors need to be locked, mirrors adjusted, etc.

Furthermore, while car seats are shown, it should be understood that the sensor systems can be used with the seats of vehicles other than cars. In an embodiment, the sensor systems are used in truck seats. In an embodiment, the sensor systems are used in boat seats. In an embodiment, the sensor systems are embedded in waterproof material in the boat seats. In an embodiment, the sensor systems are used in plane seats. In an embodiment, the sensor systems are used in train seats.

Also, while the seats discussed herein are discussed within the context of vehicles, seats, chairs and the like, the sensor technology can be implemented within or on fabrics and materials within seats found elsewhere. In an embodiment, the sensor systems are used in stadium seats. In an embodiment, the sensor systems are used with chairs within homes. In an embodiment, the sensor systems are used with seating in waiting rooms. In an embodiment, the sensor systems are used with seating on rides in amusement parks.

Additionally, while car seats are discussed, the transmitters, transmitting antennas, receiving antennas and receivers forming the sensor systems may be implemented in other components of the vehicle. In an embodiment, sensor systems are placed within the accelerator of the vehicle. Interactions with the accelerator can provide additional and more nuanced information regarding the acceleration of the vehicle. Fuel distribution and gear manipulation may be adjusted due to the information provided by the sensors in the accelerator. In an embodiment, sensor systems are placed on the gear shift of the vehicle. In an embodiment, sensor systems are placed on the handles of the vehicle, such as a motorcycle, three-wheeler or quad-cycle. In an embodiment, sensor systems are placed on the brakes of the vehicle. Interaction with the brakes can provide information related to the handling of the vehicle or implementation of airbags, etc. In an embodiment, sensor systems are implemented in the dashboard. In an embodiment, sensor systems are implemented in the clutch. In an embodiment, sensor systems are implemented in the turn signal controllers.

In an embodiment, transmitting antennas and receiving antennas forming sensor systems are implemented in the tires of the vehicle. The measurements of the signals are used to determine wear of the brakes and wear of the tires. Transmitting antennas may be implemented on the components and processed signals received by the receivers can determine variations in the measurements of received signals in order to determine alterations to the materials of the components. In an embodiment, sensors are located on the windshield. The signal transmitted via the transmitting antennas can be impacted by the liquid and reflected in the measurements processed by the signal processor. These measurements may then be used to trigger the windshield wipers to activate.

An aspect of the disclosure is a sensing system. The sensing system comprising: a group of transmitting antennas operably connected to a car seat; in a first mode, one signal is transmitted on more than one transmitting antenna of the group during a first integration period, in a second mode, the group of transmitting antennas are adapted to transmit frequency orthogonal signals on each transmitting antenna of the group during a second integration period; a plurality of receiving antennas, each one of the plurality of receiving antennas adapted to receive the plurality of signals transmitted; and a processor adapted to determine a measurement of signals received during the first mode or the second mode, wherein the processor is further adapted to process the determined measurements to determine position or movement of a passenger.

Another aspect of the disclosure is a sensing system. The sensing system comprising more than one infusion transmitting antennas adapted to infuse signals into a passenger of a vehicle, each infused signal frequency orthogonal to each other infused signal transmitted during an integration period, a plurality of receiving antennas, each one of the plurality of receiving antennas adapted to receive infused signals infused into the passenger; and a processor adapted to determine a measurement of each one of the infused signals received, wherein the processor is further adapted to process the determined measurements to determine position or movement of a passenger.

While the invention has been particularly shown and described with reference to a preferred embodiment thereof, it will be understood by those skilled in the art that various changes in form and details may be made therein without departing from the spirit and scope of the invention.

The invention claimed is:

1. A sensing system comprising:
a group of transmitting antennas operably connected to a car seat;
in a first mode, one signal is transmitted on more than one transmitting antenna of the group during a first integration period,
in a second mode, the group of transmitting antennas are adapted to transmit frequency orthogonal signals on each transmitting antenna of the group during a second integration period;
a plurality of receiving antennas, each one of the plurality of receiving antennas adapted to receive the plurality of signals transmitted; and
a processor adapted to determine a measurement of signals received during the first mode or the second mode, wherein the processor is further adapted to process the determined measurements to determine position or movement of a passenger.

2. The sensing system of claim 1, wherein the first mode is adapted to determine position of the passenger at a distance further from the car seat than the second mode.

3. The sensing system of claim 2, wherein the group of transmitting antennas is adapted to switch from the first mode to the second mode when during the first mode position of the passenger is determined.

4. The sensing system of claim 1, wherein the group of transmitting antennas are located in a head rest of the car seat.

5. The sensing system of claim 1, wherein the group of transmitting antennas are located in a back of the car seat.

6. The sensing system of claim 1, wherein the group of transmitting antennas are located in a seat of the car seat.

7. The sensing system of claim 1, further comprising another group of transmitting antennas located at a different location in the car seat than the group of transmitting antennas.

8. The sensing system of claim 1, further comprising a third mode, wherein the first mode is adapted to determine position of the passenger at a distance further from the car seat than the second mode and the third mode, wherein the third mode is adapted to determine position of the passenger at a distance further from the car seat than the second mode.

9. A sensing system comprising:
more than one infusion transmitting antennas adapted to infuse signals into a passenger of a vehicle, each infused signal frequency orthogonal to each other infused signal transmitted during an integration period,
a plurality of receiving antennas, each one of the plurality of receiving antennas adapted to receive infused signals infused into the passenger;
a processor adapted to determine a measurement of each one of the infused signals received, wherein the processor is further adapted to process the determined measurements to determine position or movement of a passenger; and
wherein in a first mode, one signal is transmitted on more than one transmitting antenna of the group during a first integration period,
wherein in a second mode, the group of transmitting antennas are adapted to transmit frequency orthogonal signals on each transmitting antenna of the group during a second integration period.

10. The sensing system of claim 9, wherein the first mode is adapted to determine position of the passenger at a distance further from the car seat than the second mode.

11. The sensing system of claim 10, wherein the group of transmitting antennas is adapted to switch from the first mode to the second mode when during the first mode position of the passenger is determined.

12. The sensing system of claim 9, wherein the processor is adapted to process determined measurements and identify the passenger based on the determined measurements.

13. The sensing system of claim 9, wherein the processor is adapted to process determined measurements and locate the passenger based on the determined measurements.

14. The sensing system of claim 9, wherein at least one infusion antenna is in the car seat.

15. The sensing system of claim 9, wherein at least one infusion antenna is located in a back of the cart car seat.

16. The sensing system of claim 9, wherein at least one infusion antenna is located in a seat of the car seat.

17. The sensing system of claim 9, wherein at least one infusion antenna is in a driver's seat and at least one infusion antenna is in a passenger seat.

* * * * *